United States Patent
Cupps

(10) Patent No.: US 7,216,605 B2
(45) Date of Patent: May 15, 2007

(54) ANIMAL MANAGEMENT SYSTEM

(76) Inventor: David E. Cupps, 1621 Evergreen Dr., Cassville, MO (US) 65625

( * ) Notice: Subject to any disclaimer, the term of this patent is extended or adjusted under 35 U.S.C. 154(b) by 107 days.

(21) Appl. No.: 10/936,330

(22) Filed: Sep. 8, 2004

(65) Prior Publication Data

US 2006/0048715 A1   Mar. 9, 2006

(51) Int. Cl.
*B60P 3/04*     (2006.01)
*B61D 49/00*    (2006.01)
*A01K 29/00*    (2006.01)

(52) U.S. Cl. ............ 119/412; 119/400; 119/712; 119/524; 119/840; 119/843; 280/491.1; 280/43.23

(58) Field of Classification Search ........ 119/412–415, 119/14.03, 400, 712, 405–407, 510, 512, 119/519, 522, 524, 906, 722–724, 729–736, 119/780, 783, 785, 752, 738–749, 840–843, 119/847–849; 280/43.22, 43.23, 476.1, 491.3, 280/491.4, 491.1
See application file for complete search history.

(56) References Cited

U.S. PATENT DOCUMENTS

| | | | | |
|---|---|---|---|---|
| 406,920 | A | * | 7/1889 | Leinard et al. ............ 119/752 |
| 2,393,016 | A | * | 1/1946 | Black ........................ 280/477 |
| 2,522,170 | A | * | 9/1950 | Fuller ........................ 119/752 |
| 2,935,965 | A | * | 5/1960 | Smith ........................ 119/729 |
| 3,017,860 | A | * | 1/1962 | Wilson ....................... 119/752 |
| 3,037,482 | A | * | 6/1962 | Jackson et al. ............. 119/732 |
| 3,699,922 | A | * | 10/1972 | Holm ...................... 119/14.03 |
| 3,796,191 | A | * | 3/1974 | McIntire ..................... 119/848 |
| 3,955,322 | A | * | 5/1976 | Call, Jr. ......................... 49/40 |
| 4,136,641 | A | * | 1/1979 | Hoffman ..................... 119/840 |
| 4,250,836 | A | * | 2/1981 | Smith ......................... 119/512 |
| 4,261,297 | A | * | 4/1981 | Van Maarion et al. ...... 119/840 |
| 4,569,309 | A | * | 2/1986 | Wilson et al. .............. 119/734 |
| 4,770,127 | A | * | 9/1988 | Volk ........................... 119/473 |
| 4,829,936 | A | * | 5/1989 | Mollhagen .................. 119/843 |
| 4,991,895 | A | * | 2/1991 | Artho ............................ 296/6 |
| 5,237,960 | A | * | 8/1993 | Wilson ....................... 119/514 |
| 2002/0179022 | A1 | * | 12/2002 | Linn .......................... 119/729 |

FOREIGN PATENT DOCUMENTS

GB        2173386 A   * 10/1986

* cited by examiner

*Primary Examiner*—Andrea M. Valenti
(74) *Attorney, Agent, or Firm*—Shook, Hardy & Bacon L.L.P.

(57) ABSTRACT

An animal management system provides an alley to control the handling of animals when procedures are to be performed on the animals by veterinarians or cattle producers. The alley is formed by a base frame, and included therewith are a headgate and preferably two wedge-shaped access doors rotatably mounted with the base frame. The headgate is movable between an entrapping position to a releasing position for an animal, and coordinated movement of the at least one access door ensures that a lead animal is properly positioned while other down line animals do not interfere with care given to, or procedures performed on, the lead animal in the headgate. Each access door allows convenient access for persons to the lead animal, and the selective use of one of two doors at a time facilitates the access to and movement of animals of different sizes in the alley. The system may also include an articulating hitch assembly for coupling the alley with a towing vehicle and decoupling the alley so that the hitch assembly substantially does not block the exit of the alley.

4 Claims, 5 Drawing Sheets

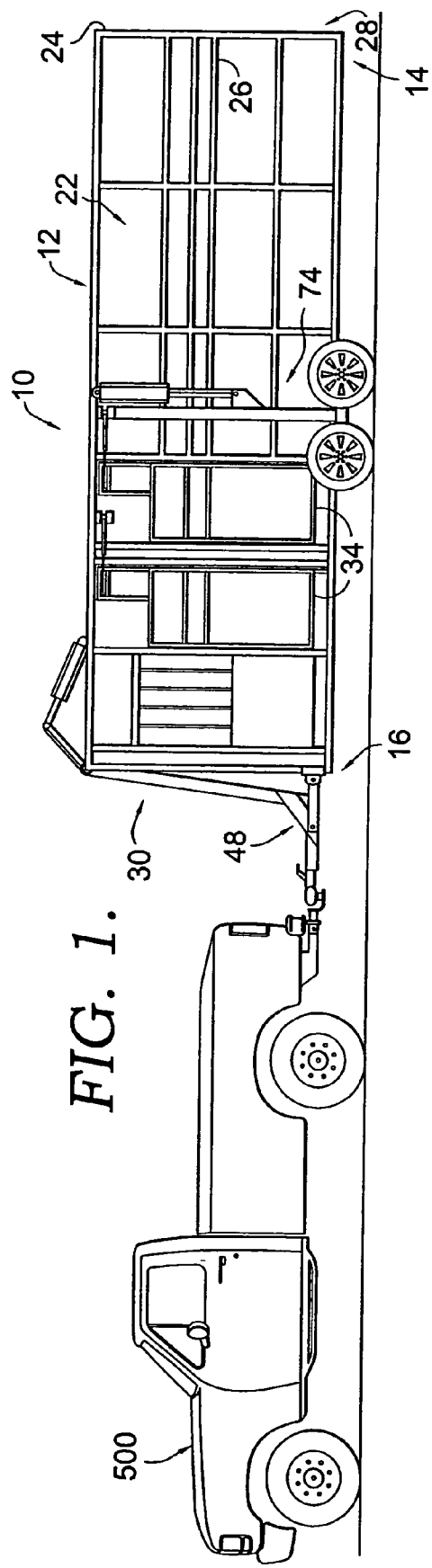
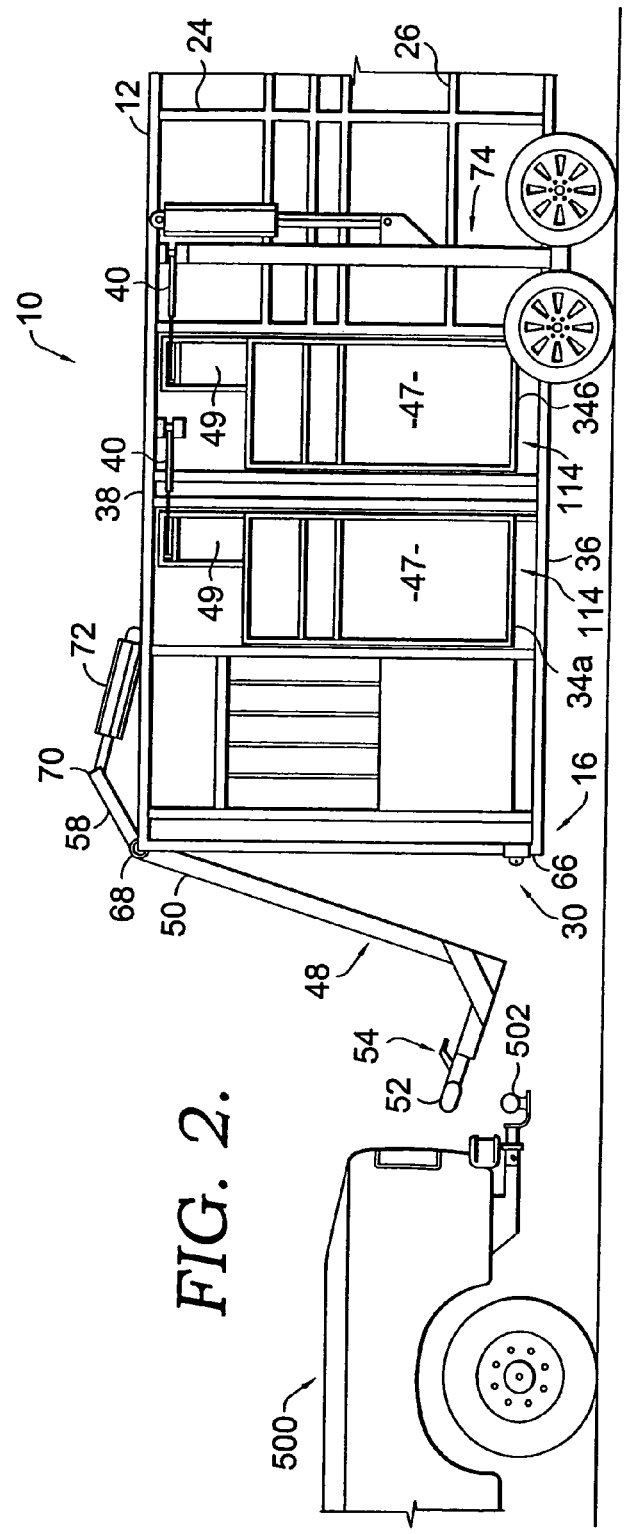

ANIMAL MANAGEMENT SYSTEM

CROSS-REFERENCE TO RELATED APPLICATIONS

None.

STATEMENT REGARDING FEDERALLY SPONSORED RESEARCH OR DEVELOPMENT

Not applicable.

BACKGROUND OF THE INVENTION

Veterinarians and cattle producers often need to give a herd of cattle a number of vaccinations, or certain health-related procedures, all in one setting. This type of mass care can be efficient because it requires the least amount of time burden for the veterinarian or other worker. Managing a large group of cattle for this type of care can be difficult, and so-called "alleys" have been devised to aid in this effort. Most alleys are narrow paths created by metal framing or fencing that have an open entrance at one end and a long and fairly narrow lineup area that leads to a chute, the chute including a headgate or similar device for entrapping the head of a cow. The headgate, along with other features of the chute, is what allows persons to safely conduct procedures on or give care to the cow while keeping the animal properly confined for an amount of time. The animals typically are herded in a single file line in the alley and follow each other up to the headgate, and upon being released from the headgate, move forward to exit the alley.

While such alleys tend to get the animals moving generally in the right direction, there often is not enough, or proper, structure in the alley to more precisely position the animals just before, and right as they reach, the headgate. For example, as a lead cow is approaching the headgate, if they become fearful, they may back up into the cows behind them. To solve this problem, some alleys have a type of door that may be swung behind the cow as they approach the headgate to block efforts to back up and prevent later cows in the line from crowding the cow currently at the headgate. However, doors of conventional configurations do not always provide a strong mechanism for preventing unwanted lead cow movement, and may even discourage cows in line behind the lead from moving forward to the headgate upon release therefrom of the lead cow.

Another issue relates to the portability of alleys. Some alley designs are configured to be pulled essentially as a trailer behind a vehicle so that they can be transported to a variety of locations for use. Because the alley is typically much longer than it is wide, trailoring of the alley requires that is be pulled along lengthwise. However, this presents a problem because any hitching mechanism would need to be located at either the entrance or exit (i.e., at the headgate) of the alley. Therefore, when the alley is disengaged from the vehicle, the hitching mechanism would still typically remain and may block or inhibit the movement of cattle into or out of the alley.

Thus, there is a need for an alley or similar system to manage cattle movement to a headgate, so that procedures or other veterinary care may be given. Such an alley, in one embodiment, is transportable by trailoring behind a vehicle.

BRIEF SUMMARY OF THE INVENTION

An animal management system provides an alley formed by a base frame and having a headgate and at least one, and preferably two, wedge-shaped access doors rotatably mounted therewith. The base frame generally has a first side section, a second side section, an entrance and an exit where the headgate is mounted. The headgate is movable between an entrapping position to a releasing position for an animal, and coordinated movement of the at least one access door ensures that a lead animal is properly positioned while other down line animals do not interfere with care given to the lead animal in the headgate. Each access door allows convenient access for the veterinarian or other individuals to the lead animal, and the use of two doors facilitates the access to and movement of animals of different sizes in the alley. The system may also include an articulating hitch assembly for coupling the alley with a towing vehicle and decoupling the alley so that the hitch assembly substantially does not block the exit of the alley.

BRIEF DESCRIPTION OF THE SEVERAL VIEWS OF THE DRAWING

In the accompanying drawings which form a part of the specification and are to be read in conjunction therewith and in which like reference numerals are used to indicated like elements in the various views:

FIG. 1 is a front elevational view of one embodiment of an animal management system of the present invention shown coupled with an exemplary towing vehicle;

FIG. 2 is a partial front elevational view of the system of FIG. 1 showing articulation of a hitch assembly to decouple the system from the towing vehicle;

DETAILED DESCRIPTION OF THE INVENTION

Figure 5:
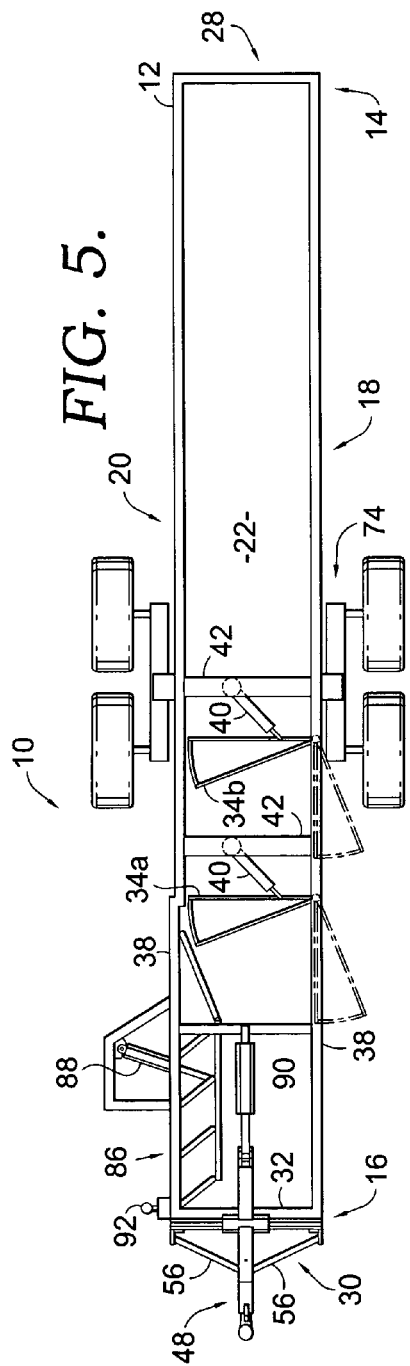
FIG. 5 is a top plan view of the system of FIG. 1.

With reference initially to FIG. 1, there is shown an animal management system 10 coupled with a towing vehicle 500. The system 10 includes a base frame 12 having a first end 14, a second end 16, a first side section 18, and a second side section 20 to define an elongate alley 22 therebetween, as can be seen in more detail in FIG. 5. The base frame 12 may include various vertical structural members 24 and horizontal structural members 26 rigidly affixed together to support the remaining components of the system 10. For instance, vertical and horizontal structural members 24 and 26, and other base frame 12 components, may be manufactured of steel, and may be welded together. An entrance 28 to the alley 22 is formed at the first end 14 and an exit 30 to the alley 22 is formed at the second end 16. In this arrangement, the first side section 18 may also be referred to as the "left side" of the alley 22, and the second side section 20 may also be referred to as the "right side" of the alley 22. A headgate 32 is mounted to the base frame 12 at the exit 30 and is generally movable between an entrapping position for securing the head of an animal therein (e.g., a cow) and a releasing position whereby the animal is free to move through the exit 30 and out of the alley 22. Those of skill in the art will appreciate that the headgate may be of any type, and for example, may be actuated through hydraulic means (e.g., hydraulic cylinder) or manually (e.g., typically under spring force). A pair of wedge-shaped doors 34 is pivotably mounted onto the base frame 12 preferably on the left side 18 of the alley 22 for swinging thereof into and out of the alley 22 for selective obstruction of the pathway of an animal in the alley. More specifically, the wedge-shaped doors 34 comprise a leading door 34a and a trailing door 34b, and each swingingly mount with a lower longitudinal member 36 and an upper longitudinal member 38. In another embodiment of the system 10, one of the doors 34 may be omitted if only one general size group of animals (e.g., cows) are moved through the alley 22. For example, if only adult or larger cows are used, then leading door 34a may be omitted if desired, because the cow will fit well between the headgate 32 and the trailing door 34b within the alley 22; conversely, if only immature or smaller cows up to a given length are used, then trailing door 34b can be omitted, as the small cow will fit between the headgate 32 and the leading door 34a within the alley 22. However, it is preferred to include both leading and trailing doors 34a, 34b so that more efficient access to and movement of animals of varying sizes may be achieved, as will be more fully explained herein.

Figure 6:
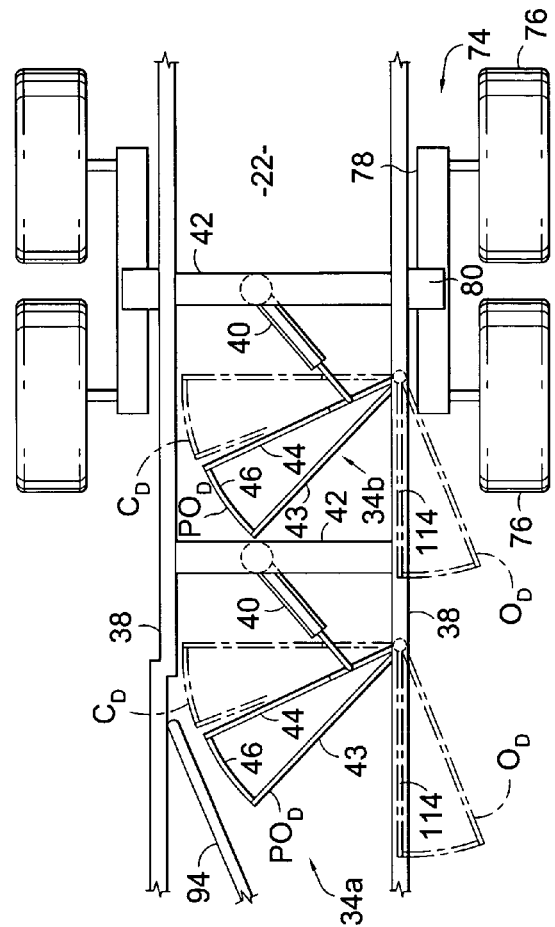
FIG. 6 is a close-up partial top plan view of the system of FIG. 1 showing the movement of the access doors.

Selective swinging of the wedge-shaped doors 34 may be accomplished by hydraulic cylinders 40 or similar means pivotably coupled with the doors 34 on one end and with secured with various structural members 24, 26 of the base frame 12 frame components. For example, the cylinders 40 may be coupled with upper lateral members 42 interconnecting upper longitudinal members 38 of the base frame 12. In FIG. 6, a closed position $C_D$ for the doors 34 is shown by one set of dashed lines; a partially-open position $PO_D$ for the doors 34 is shown by a set of solid lines; and a fully-open position $O_D$ for the doors 34 is shown by another set of dashed lines. Each of the doors 34 preferably has a first vertical panel 43, a second vertical panel 44 offset at an angle from the first panel 43 and a curved bracing member 46 spanning therebetween. The doors 34 may have a lower region 47 having a width such that when the doors 34 are in the closed position $C_D$, the alley 22 is substantially blocked, and an upper region 49. The height of the lower region 47 may be sufficiently above the average line-of-sight for the typical size of cattle traveling through the alley 22 (e.g., average adult) so that an animal rearward of one of the doors 34 in the closed position $C_D$ cannot see another animal forward of the respective door 34; the rearward animal, thus, has an obstructed view. It should also be understood that a door 34 being "wedge shaped" does not require a specific wedge or "pie" like shape, but merely a degree of narrowing of the space between the first and second panels 43, 44 moving from the bracing member 44 towards the mounting with the lower and upper longitudinal members 36 and 38.

The system 10 is preferably transported by coupling with towing vehicle through an articulating hitch assembly 48 mounted with the base frame 12, as seen in FIGS. 1–3 and 5. The hitch assembly 48 includes a generally L-shaped rigid coupling member 50 having a hitch ball receiver 52 at a forward end 54 thereof, a pair of bracing arms 56 interconnecting the coupling member 50 with the base frame 12, and an upper working member 58. The bracing arms 56 are mounted to the coupling member 50 on a first end 60, and are each releasably pinned with a sleeve 62 on an opposing second end 64 thereof. The sleeves 62 are extended over forward vertical members 66 of the base frame 12 and are fixed in position. The bracing arms 56 thus provide lateral and longitudinal support, with respect to the alley 22, to the coupling member 50 when in the transport position. The coupling member 50 moves upwardly and downwardly around a hitch assembly pivot point 68 where the member 50 is pivotably mounted to the frame 12. The upper working member 58 extends from the coupling member 50 at the pivot point 68, and has a free end 70 pivotably coupled with the working end of a hydraulic cylinder 72 mounted with another upper lateral member 42 of the base frame 12.

The hitch assembly 48 is shown in a towing position in FIG. 1. Once the desired location for use of the alley 22 is chosen, the bracing arms 56 are first unpinned from the sleeves 62 on the second end 64 and detached from the coupling member 50 (or if pivotally connected with the coupling member 50, rotated laterally outwardly therefrom) on the first end 60. Then, the hydraulic cylinder 72 is activated and retracted by pulling the free end 70 of the upper working member 58 rearwardly, thereby rotating the upper working member 58 and coupling member 50 clockwise about the pivot point 68, as shown in FIG. 2. This action dismounts the receiver 52 from a hitch ball 502 of the towing vehicle 500. Preferably, the hydraulic cylinder moves the hitch assembly 48 upwardly to the position shown in FIG. 9, such that sufficient vertical clearance between the surface the system 10 is resting upon and the lowermost point of the coupling member 50 is attained for cattle or other animals to move out of the exit 30 and out of the alley 22 when released from the headgate 32. Reverse activation to achieve extension of the hydraulic cylinder 72 will move the hitch assembly back to position for mounting with the towing vehicle 500.

Figure 3:
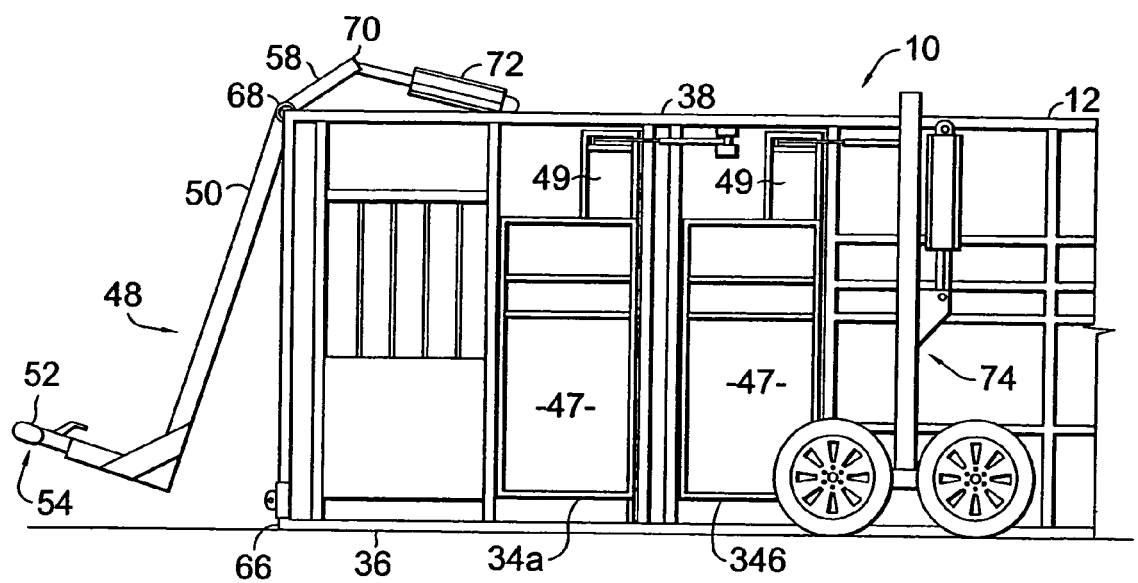
FIG. 3 is a partial front elevational view of the system of FIG. 1 showing lowering of the alley to the ground in a use position.
Figure 4:
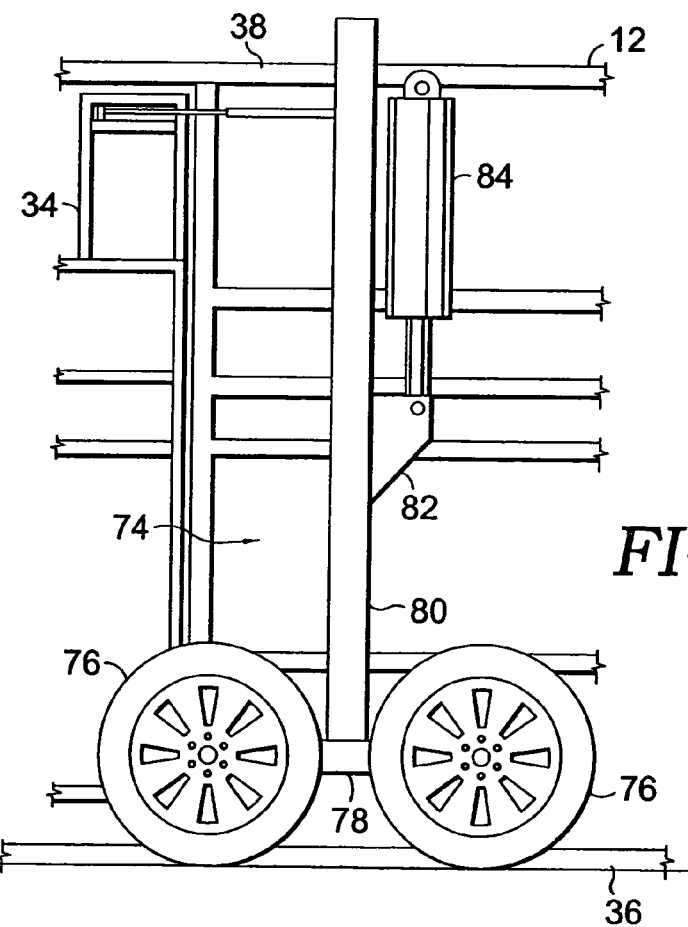
FIG. 4 is a close-up partial front elevational view of the system of FIG. 1 showing the cattle alley lifting mechanism.

To make use of the alley 22 to manage cattle movement, the system 10 must be lowered so that the same rests on an underlying surface or ground. This is preferably done prior to the hitch assembly 48 being dismounted from the towing vehicle 500 so that the weight of the system 10 is borne by the alley 22, as seen in more detail in FIG. 4. Each axle assembly 74 includes at least one wheel 76 mounted with a generally horizontal support member 78 and a vertical support member 80 extending from each horizontal member 78. Two wheels are show for each axle assembly 74 in the figures, but one wheel could be used as an example. The vertical support member 80 has a bracket 82 extending therefrom, and another hydraulic cylinder 84 is coupled to the bracket 82 on a lower end 86 and coupled to one of the upper longitudinal members 38 on an upper end 88 of the cylinder 84. Each hydraulic cylinder 84 is in an extended position when the wheels 76 support the system 10 for transportation, as seen in FIGS. 1 and 2. Retraction of the cylinders 84, as seen in FIGS. 3 and 4, will cause the other components of the system 10 (e.g., alley 22) to lower with respect to the axle assemblies 74 until the base frame 12 rests upon the underlying surface or ground. The base frame 12 is thus immobilized until the cylinders 84 are once again extended.

As seen in more detail in FIGS. 5–8, a squeeze assembly 86 is also mounted with the base frame 12, and under actuation by a hydraulic cylinder 88, directs and thereby restricts animal movement when positioned in a confinement area 90 between either of the wedge-shaped doors 34 and the headgate 32. A controller 92 may be mounted with the base frame 12 such that user commands may be inputted for directing the activity of the hydraulic cylinders 40 and 88 to thereby induce movement of each of the wedge-shaped doors 34 and squeeze assembly 86, respectively (and preferably, the headgate 32). For example, the controller 92 may have various levers or buttons to accept user input and being connected with circuitry generating signals for activation of a motor and hydraulic pump (not shown) to generate movement of the hydraulic cylinders 40 and 88, or other mechanisms implemented to affect motion of various components of the system 10. Another controller (not shown) may be provided for accepting user commands for directing the activity of hydraulic cylinders 72 and 84 to induce movement of the hitch assembly 48 and axle assembly 74.

Figure 7:
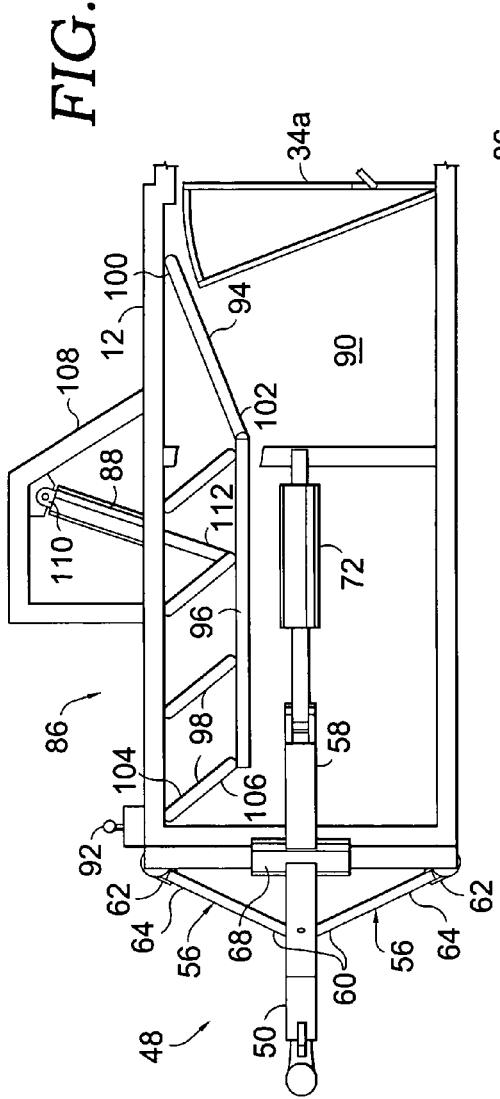
FIG. 7 is a close-up partial top plan view of the system of FIG. 1 showing the squeeze assembly in the extended position.
Figure 8:
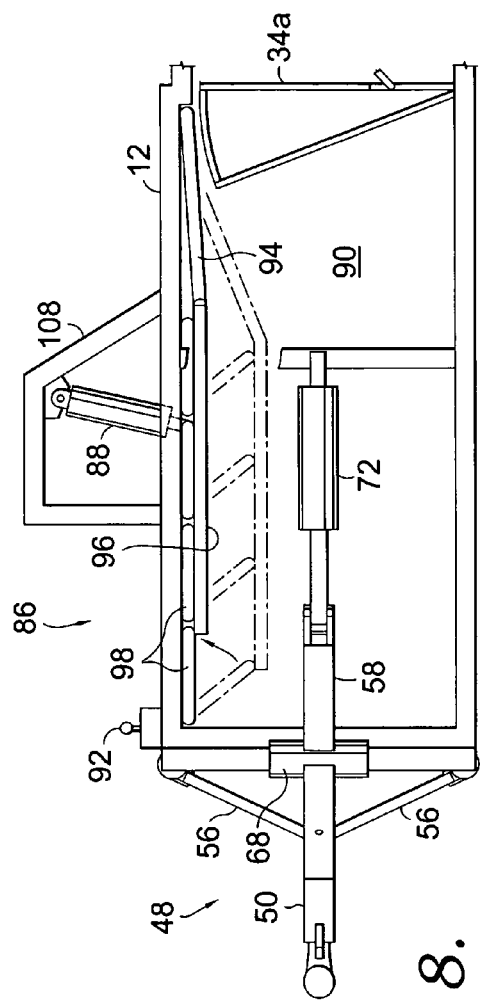
FIG. 8 is a close-up partial top plan view of the system of FIG. 1 showing the squeeze assembly in the retracted position.

The squeeze assembly 86 includes directing plate 94, contact plate 96 and brace bars 98. Directing plate 94 is slidably coupled with one of the vertical or horizontal structural members 24, 26 of the base frame 12 on one end 100 thereof, and pivotably connected with the contact plate 96 on an opposing end 102 thereof. The brace bars 98 are each pivotably coupled with a base frame structural member 24, 26 on one end 104 thereof, and with the contact plate 96 on an opposing end 106 thereof. A bracket member 108 extends from the right side or second side section 20 of the alley 22. The hydraulic cylinder 88 has one end 110 possessing a pivot connection with the bracket member 108 and an opposing end 112 possessing a pivot connection with one of the brace bars 98; alternatively, the opposing end 112 may have a pivot connection with the contact plate 96. Extension of the hydraulic cylinder 88 causes rotation of the brace bars 98 away from the base frame structural members 24, 26 on the second side section 20 of the alley 22, the contact plate 96 to move inwardly in the alley 22, and the one end 100 of the directing plate 94 to slide forwardly along a guide (not shown) on one of the base frame 12 structural members 24, 26. This movement arranges the squeeze assembly 86 as shown in FIG. 7 to provide less lateral space in the confinement area 90. Retraction of the hydraulic cylinder 88 causes the brace bars 98 to rotate towards the second side section 22 of the alley 20, the contact plate 96 to move outwardly in the alley 22, and the directing plate end 100 to slide rearwardly. Accordingly, the squeeze assembly 86 provides increased lateral space in the confinement area 90, as shown in FIG. 8. When an animal is entering the confinement area 90 past the wedge-shaped doors 34, or leaving the confinement area 90 by moving past the headgate 32 out the alley exit 30, the squeeze assembly 86 is typically moved to the retracted position shown in FIG. 8. Conversely, the squeeze assembly 86 may be moved to the extended position shown in FIG. 7 when an animal is in the confinement area 90 for receiving Veterinary care or other services, so that there is little room for the animal to try and move laterally or turn around. However, if an animal is too large to fit in the lateral dimension between the contact plate 96 and the first side section 18 or left side of the alley 22 when the squeeze assembly 86 is in the extended position, the assembly 86 may be held in the retracted position while that particular animal is being handled.

The movement of cattle though the alley 22 is best understood with reference to FIGS. 5–8. Upon the system 10 being lowered to the ground, cattle may enter in a single file line through entrance 28 of the alley 22. The wedge-shaped doors 34 are initially in the fully open position $O_D$, as seen in FIGS. 1–3. Once a first cow passes the appropriate door 34 (e.g., the leading door 34a for smaller cows, trailing door 34b for larger cows) and into the confinement area 90, such door 34 will quickly move to the closed position $C_D$ to prevent the cow from backing out of the area 90 and obstruct the travel of other successive cows into the area 90. Additionally, when the cow has moved sufficiently forward, the headgate 32 will move inwardly to an entrapping position to prevent the animal from leaving through the alley exit 30. Simultaneous with movement of the appropriate door 34 to the closed position, or anytime thereafter, the squeeze assembly 86 may move to the extended position such that contact plate 96 narrows the width of the alley 22 in the confinement area 90, further restricting animal movement. Because the doors 34 are solid and cannot be seen through by successive cows, these cows generally tend to not push on the doors 34 to reach the leading cow, thereby putting less stress on the doors 34 and other components of the system 10.

At this point, the veterinarian or other person performing procedures on the entrapped animal may enter through an opening 114 in the left side or alley first side section 18 formed by the respective wedge-shaped door 34 that has moved to the closed position $C_D$ or to another position away from the fully-open position $O_D$ inwardly into the alley 22 a sufficient amount for the person to pass through the opening 114 without the animal blocking their path.

Subsequently, the wedge-shaped door 34 that has moved to the closed position $C_D$ is moved to the partially open position $PO_D$ so that successive cattle can see the leading cow entrapped in the confinement area 90. This tends to make the successive cattle want to follow the lead cow into the confinement area 90. The lead cow is then released by moving the headgate outwardly into a releasing position and the contact plate 96 of the squeeze assembly 86 moves to the retracted position so that the animal can easily move through exit 30 and out of the alley 22. The respective door 34 in the partially-open position $PO_D$ is then moved to the fully-open position $O_D$ so that the next cow in line behind the lead cow can move into the confinement area 90. This next cow in line tends to want to follow the lead cow out of the alley exit 30, so it will naturally move forward in the alley 22, as will other successive cows in line with respect to the cow ahead of them. As soon as this cow attempts to follow the lead cow out of the alley exit 30, the headgate 32 will move to the entrapping position to capture the cow. At generally the same time, or at any time after the following cow has cleared the forward point of the respective door 34 (at the bracing member 46), the door will immediately move to the closed position $C_D$ to prevent additional cows from attempting to enter the confinement area 90, and if needed, the squeeze assembly 86 will move to extend the contact plate 96 towards the confined animal. Again, the particular door 34 in motion depends on the size of the animal being confined (e.g., leading door 34a for small cows, trailing door 34b for large cows). At this point, the process can be repeated for each cow to be treated. Because, as shown in FIG. 9, the hitch assembly 48 may be rotated upwardly, cows can easily move out of the alley exit 30 without having to avoid the hitch assembly 48.

The wedge-shape of the doors 34 is advantageous for a couple of reasons. First, the shape of the doors 34 provides a degree of longitudinal space in the alley 22 between the leading cow and the next cow in line. At the same time, the doors 34 are sufficiently narrow near the pivot point at the left side or side section 18 of the alley 12. This ensures that the door 34 is balanced about the pivot, making it easy to swing, and does not protrude excessively into the alley 22 when in the fully-opened position $O_D$, nor outside the alley 22 which could interfere with the movements operator of the system 10.

Figure 9:
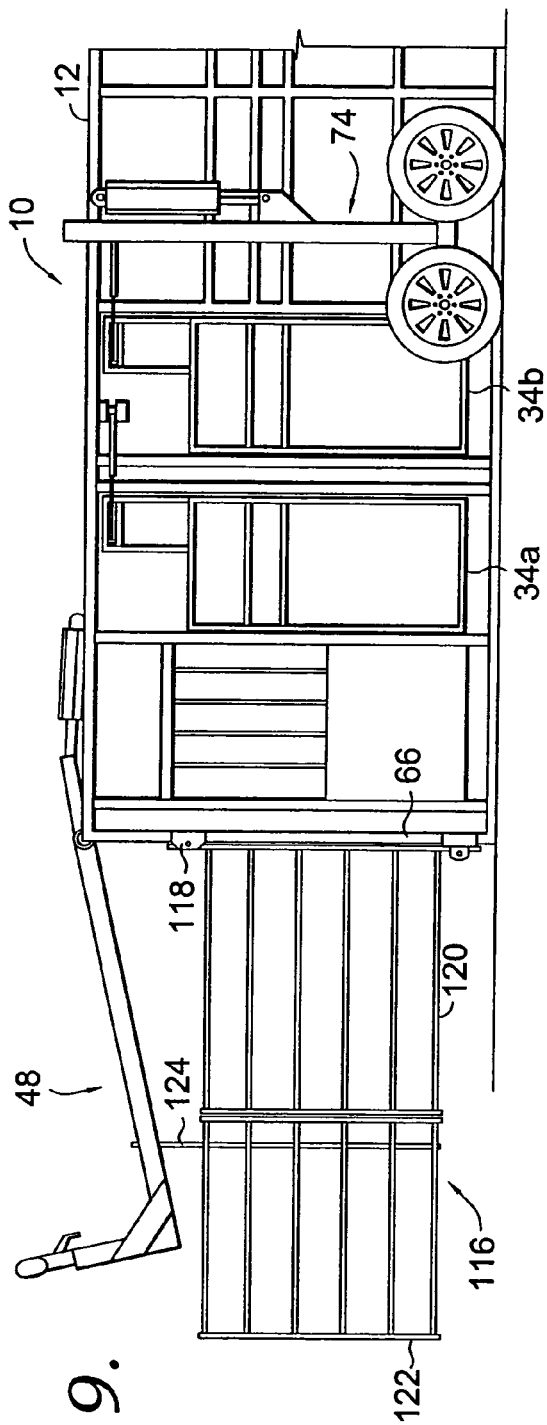
FIG. 9 is a partial front elevational view of another embodiment of the system of the present invention having a sorting gate.
Figure 10:
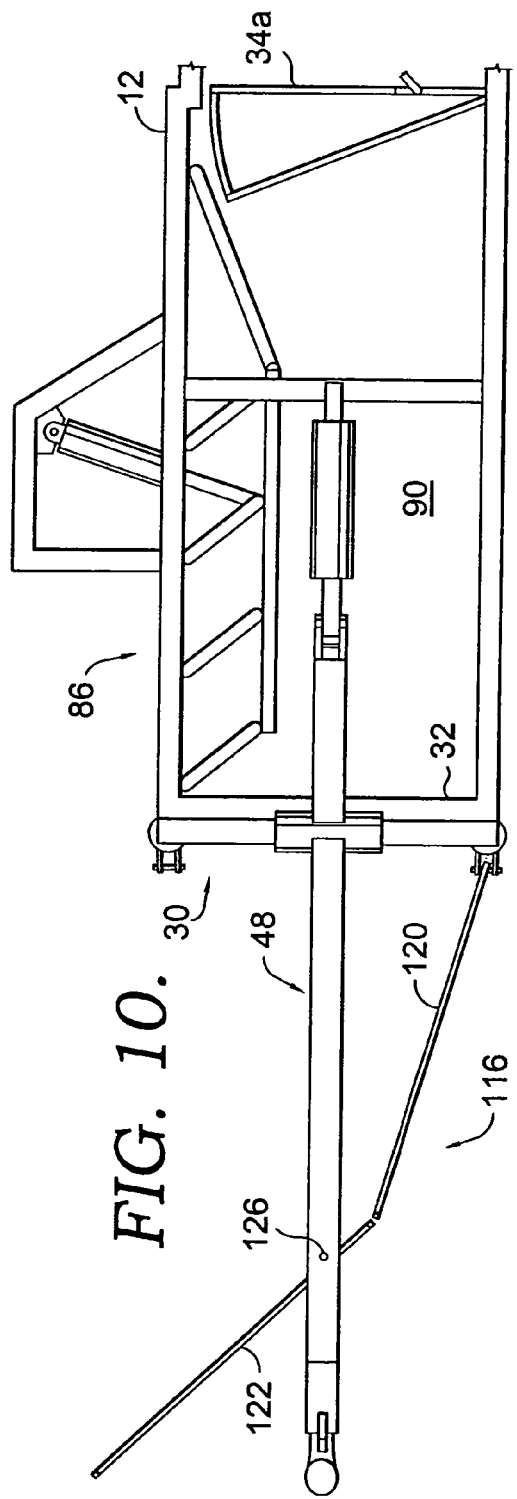
FIG. 10 is a close-up partial top plan view of the system of FIG. 9.

FIGS. 9 and 10 show an additional feature that may be implemented with the system 10 of the present invention. A sorting gate 116 may be coupled with one of the forward vertical members 66 of the base frame 12 by a set of clamps 118. These clamps 118 allow the sorting gate 116 to swing or pivot relative to the base frame 12. Ideally, the clamps 118 attach with one forward vertical member 66 at either the left or right side (i.e., on first or second side sections 18 or 20) of the frame 12. The sorting gate 116 is formed to have a first section 120 extending from the clamps 118 and hingedly connected with a second section 122. The second section 122 has a vertical rod 124 arranged to extend through an opening 126 in the coupling member 50 of the hitch assembly 48. However, other means may be used to affix the position of the sorting gate second section 122 with respect to the hitch assembly 48. This configuration for the sorting gate 116 allows the operator to direct animals leaving through the exit 30 of the alley in a certain direction, for example, to a particular holding pen for a certain type of cattle (e.g., dairy or beef cattle, male or female cattle, adult cows and calves, etc.). In the arrangement shown in FIG. 10, animals leaving the alley 22 are directed to their right. The clamps 118 may be moved to the forward vertical member 66 on the right side of the frame 12, if desired, which would then position the sorting gate 116 to direct the travel of animals leaving the alley exit 30 to their left, opposite of what is shown in FIG. 10.

From the forgoing, it can be seen that various embodiments and features of the animal management system 10 of the present invention provide a safe, efficient and effective tool for arranging cattle or other animals to receive various procedures, such as those performed by veterinarians. The system 10 may also be transportable for use in various locations where cattle may be located. Furthermore, since certain changes may be made in the above invention without departing from the scope hereof, it is intended that all matter contained in the above description or shown in the accompanying drawing be interpreted as illustrative and not in a limiting sense.

What is claimed is:

1. A portable animal management system, comprising:
   a base frame having a first side section, a second side section, a first end defining an entrance and a second end forming an exit, the first and second side sections and the first and second ends collectively defining therebetween an elongate alley; a headgate mounted with the second end, the headgate selectively movable from an entrapping position to a releasing position for an animal;
   at least one wedge-shaped access door rotatably mounted to the first side section of the base frame at a position spaced from the headgate, the first wedge-shaped access door configured to be rotatable by mechanical means from a first position substantially obstructing the alley to inhibit animal movement therethrough, to a second position substantially not obstructing the alley;
   an articulating hitch assembly, the hitch assembly being pivotably coupled with the base frame to move a hitch connector from a lower position for coupling with a tow package of a vehicle to an upper position removed from coupling with the vehicle tow package, wherein at the upper position, the hitch assembly substantially does not block the headgate and is positioned above the headgate and;
   a sorting gate having a first section and a second section hingedly connected together, the first section being coupled with the base frame by one or more clamps and the second section secured to the hitch assembly by a vertical member insertable into an opening of the hitch assembly so that animals leaving the alley at the headgate may be selectively guided in a certain direction.

2. The system of claim 1, wherein the at least one wedge-shaped access door may be pivoted by one of a hydraulic cylinder and a pneumatic cylinder.

3. The system of claim 1, further comprising a squeeze assembly mounted with the base frame between the headgate and the at least one wedge-shaped access door and laterally movable between an extended and retracted position to selectively restrict the width of a portion of the alley.

4. The system of claim 1, further comprising a pair of axle assemblies each including a wheel, each axle assembly being mounted with the base frame and vertically movable between an extended position where the wheel is contact with an underlying surface to support the cattle management system, and a retracted position where the wheel is not in contact with an underlying surface such that the base frame substantially supports the system without contribution from the axle assembly.

* * * * *